Patented Jan. 26, 1943

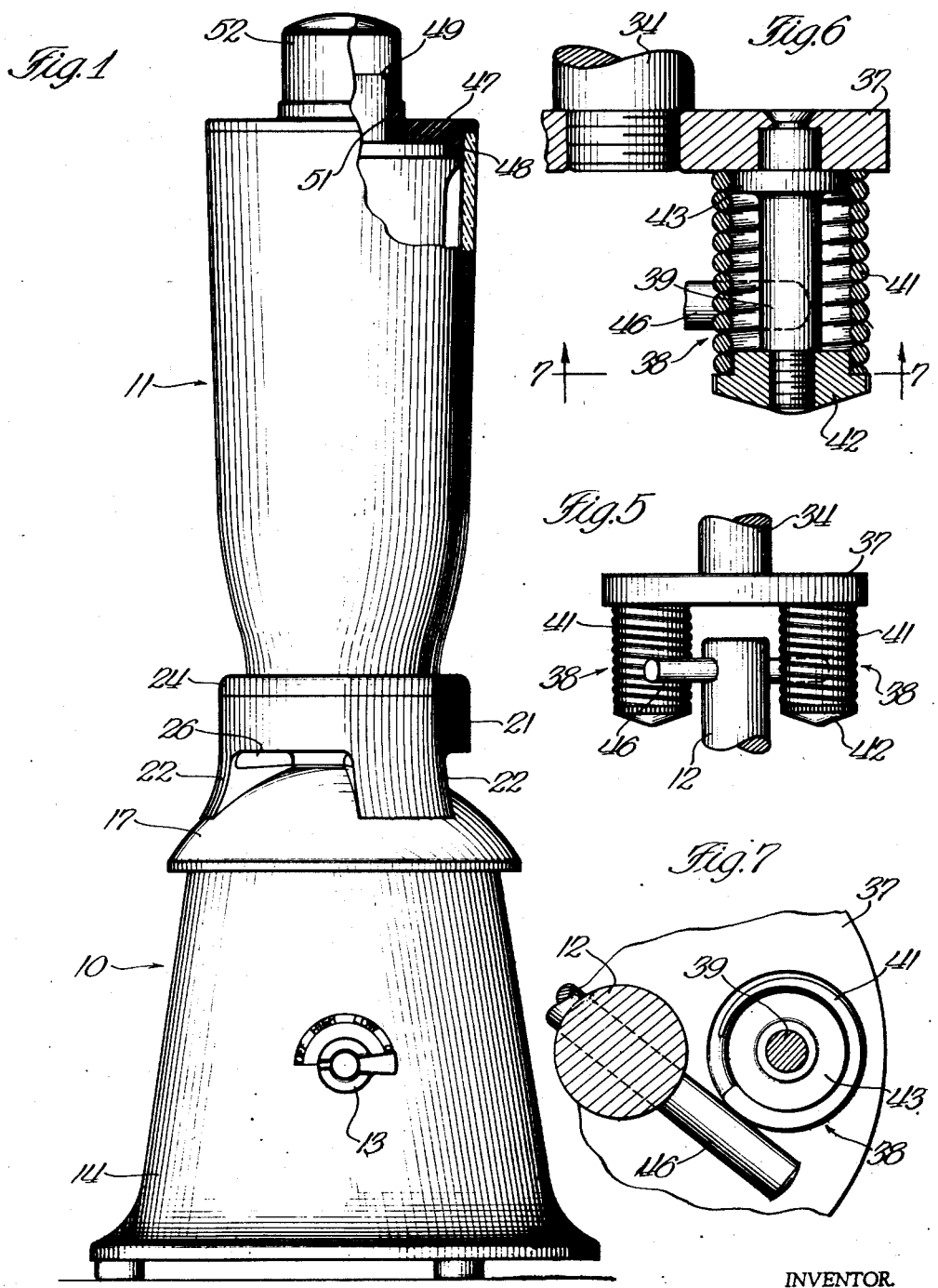

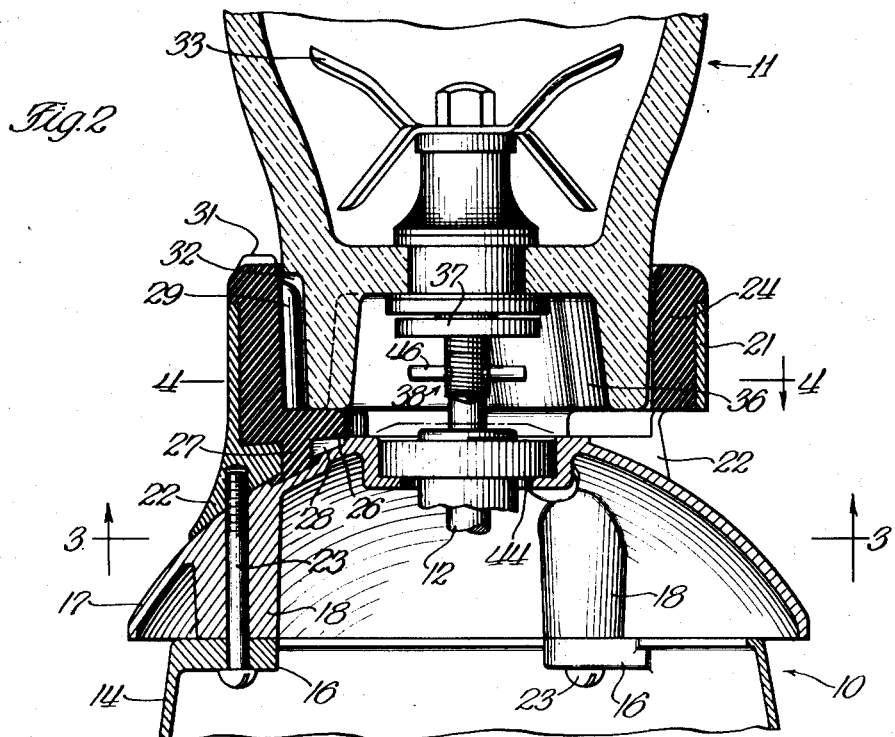
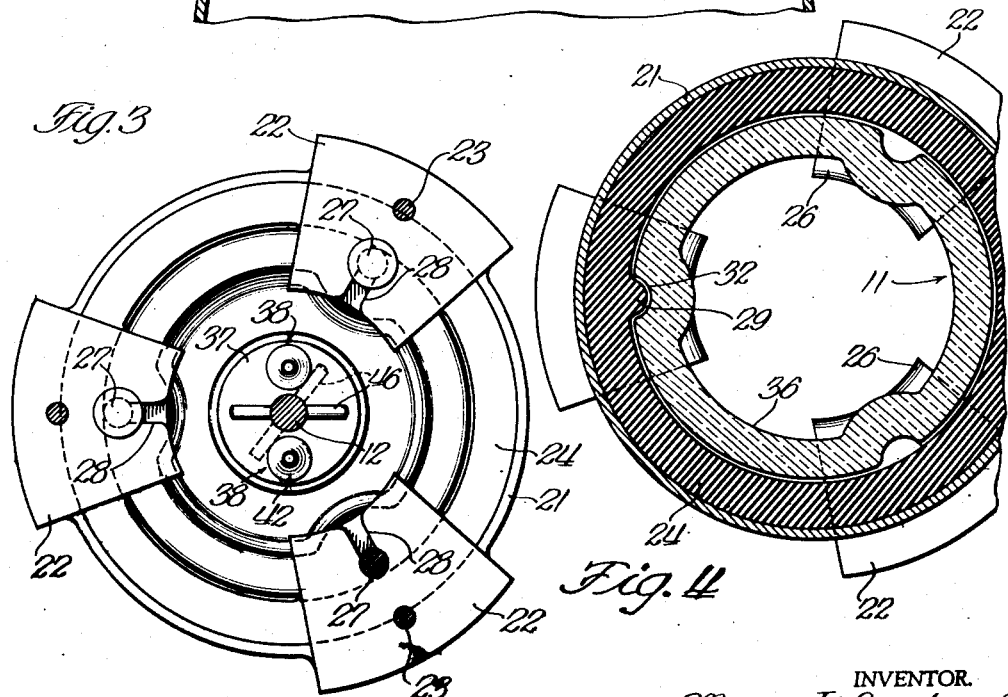

2,309,347

UNITED STATES PATENT OFFICE 2,309,347

FOOD MIXER

Myron J. Landgraf, Chicago, Ill., assignor to Henry J. Goldblatt, Chicago, Ill.

Application March 23, 1940, Serial No. 325,530

7 Claims. (Cl. 259—108)

My invention relates in general to mixing devices and more in particular to supporting and driving connections between the bowl and base which carries the motor.

Mixing and liquefying devices of the general type disclosed in my prior applications Serial No. 270,319 issued as Patent No. 2,278,125 on Mar. 31, 1942 and 270,320 issued as Patent No. 2,284,155 on May 26, 1942, filed April 27, 1939, operate at relatively high speed with the result that there is a very strong centrifugal action to the material in the bowl and a pronounced tendency for the bowl body to move with respect to the base which carries the motor. Those skilled in the art are well aware of this situation and the result has been that the bowl has been attached to and supported on the base by means which resulted in a wedging and clamping action against the bottom of the bowl. The drive connection between the two shafts, one carried by the base and the other carried by the bowl portion, has also been such as to cause a relatively firm engagement. In other words, because of the assumed tendency of the bowl to lift as well as rotate with respect to the base, the bowl has been mounted and gripped in place to cause an attachment almost as if it were constructed with the base, notwithstanding the fact that it had to be removable from the base to permit pouring the contents from the bowl. This resulted in the necessity of maintaining very close dimensions and, in general, replacing the bowl in exactly the position which it had when removed from the base.

I have found that by providing a loose but relatively resilient support for the bowl and a loose but relatively resilient drive between the shaft carried by the base and the shaft journaled in the bottom of the bowl, I am able entirely to overcome the problems which have heretofore been encountered while at the same time avoiding any tendency for the bowl to become unstable and have any objectionable movement with respect to the base during operation. The bowl may be placed on the base in any one of several positions, whatever the relative positions of the shaft connecting mechanism may be. By suitable structure utilizing the principle of a loose but adequate support and drive connection, I not only secure definite advantages so far as the use of the mixer is concerned, but I am also able to simplify construction and assembly of parts with a concomitant saving in manufacturing costs.

In the accompanying drawings, I illustrate one embodiment of the invention, wherein Fig. 1 is an elevational view, the upper part of the bowl being broken away to illustrate a structural feature;

Fig. 2 is an enlarged fragmentary vertical sectional view taken through that portion of the mixer where the bowl is supported on the base;

Fig. 3 is an irregular bottom plan section taken on the line 3—3 of Fig. 2, looking in the direction of the arrows;

Fig. 4 is a fragmentary sectional view taken on the line 4—4 of Fig. 2;

Fig. 5 is an enlarged fragmentary elevational view showing the drive connection between the shaft carried by the base and the shaft carried by the bowl;

Fig. 6 is an enlarged fragmentary sectional view showing some of the structural features of the drive mechanism; and Fig. 7 is a sectional view taken on the line 7—7 of Fig. 6, looking in the direction of the arrows, the lower drive shaft also being included in the view in order to illustrate the manner of its engagement.

In general, the device of my present invention utilizes the principles and general structural features disclosed in my prior co-pending applications. I utilize a base indicated generally by the reference character 10, and mixing bowl indicated generally by the reference character 11. The base 10 houses a suitable motor, not shown, driving a shaft 12 through which power is delivered to the mixing mechanism carried by the bowl in a manner to be described. Suitable current control mechanism, such as a switch 13, is carried by the base whereby to operate the motor at a selected speed determined by the operation being carried out. The bowl is readily removable from the base and functionally associated therewith, materials to be mixed or liquefied being introducible into the bowl, as will be described. For the purpose of bringing out the association between the mixing bowl and base, I shall first describe the structure of that part of the base with which the bowl is associated.

The base comprises a housing member 14 having a plurality of equally spaced internally projecting lugs 16. Above the base, a cover member 17 is provided comprising in general a portion of a sphere so far as its shape is concerned, although it may have a modified appearance as determined by the design. The cover member 17 is provided with a number of equally spaced integral legs 18 corresponding in position to the lugs 16. Above the cover member 17, and spaced therefrom, is a ring member 21 having a plurality of equally spaced leg members 22. As appears particularly clear from Fig. 2, these leg members 22 flare outwardly slightly and have their bottom surfaces shaped to correspond to the contiguous upper surface of the cover member 17. The number of legs 22 is the same as the number of legs 18 and lugs 16, so that machine screws 23 extending upwardly through apertures in the lugs 16 and legs 18 may be threaded into bottom apertures in the legs 22 to form an assembly including the housing 14, the cover member 17, and ring member 21. These parts are all of metal according to the preferred structure.

The ring member 21, with a resilient supporting insert which will now be described, forms a generally cup-shaped loose support for the bowl 11. The resilient supporting insert, preferably formed of relatively live rubber, such as a semi-soft vulcanized rubber compound, comprises a ring portion 24 extending somewhat above the ring portion 21 and shaped with an annular upper flange projecting over the upper edge of the ring member 21. At the position of each leg 22, the resilient member is provided with internal supporting projections 26 as shown, from the lower edge of which relatively small, irregular projections 27 extend downwardly. These projections have a relatively narrow intermediate portion and a relatively broader terminal portion. The legs 22 have an annular opening through which the projection 27 protrudes together with edge slots 28 communicating with the opening. By utilizing the edge slot 28, the projection 27 may be inserted in the position shown in Fig. 2 (the relationship also appears clear from Fig. 3) so that the resilient supporting insert comprising the ring 24 is substantially firmly associated with the supporting ring 21. The upper portion of the cover member 17 is provided with a slight depression as shown in Fig. 2 at each position of the projection 27, so that, when the machine screws 23 are tightened, the resilient supporting member is wedged between the upper portion of the cover member 17 and the lower portion of the legs 22 to prevent withdrawal of the resilient supporting member. At one position, the resilient ring 24 has an internally extending radial projection 29, and immediately adjacent this projection and on the upper edge of the ring member a relatively small indicating projection 31. The indicating projection 31 may be formed a different color than the remaining portion of the resilient ring 24.

From the above description, it will be clear that the resilient portions 24 and 26, with the metal portions including the ring member 21 reinforcing them, form in general a cup-like upper recess in which the base of the mixing bowl 11 may be inserted in such a way that the base of the mixing bowl is loose around the periphery, and the lower edge thereof merely rests upon the internally extending supporting projections 26. From Fig. 2, it will be clear that there is ample space between the outside of the bowl and the inside surface of the ring 24 so that, even allowing for some manufacturing tolerances, the bowl will always be loose within its support on the base. With the exception of a plurality of edge recesses 32 on the bowl, the lower edge is uniform, regular and unbroken. Thus the bowl may be set in any position in which one of the edge recesses 32 coincides with the location of the projection 29.

The bowl carries an impeller 33 carried by a shaft 34, the shaft 34 being journaled in supporting and sealing mechanism in the general manner described in my prior applications. The bottom recess 36 in the mixing bowl provides space for a specially designed clutch mechanism cooperating with a clutch mechanism forming a part of the drive shaft 12. The arrangement is such that, independently of the position of the parts, a driving connection will be established by the mere act of inserting the bowl in position on the base, and means is provided for producing an adequately resilient engagement between the parts while still maintaining positive drive conditions.

Referring now first to the driving member of the clutch arrangement, this utilizes a disk 37 secured to the bottom of the shaft 34 and carrying a pair of downwardly projecting clutch members 38. Each clutch member comprises a stud 39 carried by the disk 37, a spring 41, and a specially designed nut 42. The stud 39 has a shoulder 43 over which the end convolution of the spring engages, and the nut 42 has a cut-away portion which engages within a convolution of the spring at the other end, the nut, however, having a portion which engages over the end edge of the spring so that the spring is held taut between the face of the disk and one edge of the special nut 42. In actual practice, the spring 41 is wound with its convolutions close together. The result of the construction is that, if there is pressure against the side of the spring intermediate the ends thereof, the spring as a body will be deformed slightly as a result of the pressure but will always tend to resume the position shown in the drawings.

The drive shaft 12 is journaled in a special attaching and sealing assembly 44 which lies within a generally cup-shaped upper recess in the cover member 17. The upwardly projecting end of shaft 12 carries a driving pin 46. The parts are so constructed and arranged that the driving pin 46 engages against the edge of the spring members 41 approximately at their midpoints as shown in Fig. 5. If a bowl is removed and then later set back on the base without in the meantime moving any of the drive parts, the parts will always occupy a position with the driving pin projecting at some angle between the two downwardly projecting clutch members 38. Should any of the parts be turned, however, it may occur that the driving pin 46 will be substantially dead in line with the axis of the studs 39. Under these circumstances, however, engagement will still take place because the lower end face of the nut 42 is rounded and, of course, the driving pin 46 is rounded. The parts, therefore, will be moved relative to each other so that the bowl may be inserted into its final position and the parts will occupy the position shown in general in Fig. 5.

In Fig. 1, I illustrate a special cover arrangement wherein a cover 47, preferably formed of semi-soft rubber, has a portion extending over the top edge of the bowl and an annular portion 48 extending within the bowl whereby to hold the cover firmly in position. A round cup-like upper projection 49 is continuous with an opening formed through the main body of the cover. The cup-shaped portion is provided with a separate cover 52, such as a stainless steel cap or the like. By this arrangement, the bowl may be kept covered during operation and only the cap 52 removed for the purpose of inserting portions of vegetables or the like through the hole 51. During operation, therefore, materials which are to be comminuted or liquefied may be gradually introduced with no danger of splashing the contents out of the bowl.

The combination of the loose resilient support for the bowl on the base, and the loose resilient drive produces a very desirable action. Absolutely true alignment of the shafts is not necessary to satisfactory operation. In addition to permitting relatively loose support and partial mis-alignment of the bowl, the resilient drive has two other advantages. It cushions the action of the propeller slightly, producing an even and smooth application of power, and also permits some shifting of the bowl on its support to improve the alignment. For example, should be bowl be slightly tipped due to the fact that one edge has not seated on the surface of the support comprising the projections 26, the bowl may right itself during operation. If it does not right itself entirely, the operation may still continue, the driving connections functioning partially as a universal joint. For this and other reasons, the spring portion preferably comprises stainless steel wire, and the driving pin is case hardened. Other types of resilient connections may be used, such as rubber, but the useful life is much less than with my construction.

While the drive cushions the action of the propeller, still there is a tendency of the propeller to throw materials upwardly, particularly during starting. The combination of the special cover construction and resilient drive inhibits entirely the throwing of material from the bowl. The cap 52 may be removed and vegetable or like material introduced through the opening 51 while the propeller is being operated.

What I claim as new and desire to protect by Letters Patent of the United States is:

1. In a food mixer of the character described, a base having as a bowl support a generally cup-shaped member of resilient material, a mixing bowl having a lower portion adapted to set loosely in said cup-shaped member, means effective at more than one position of the bowl for preventing turning of said bowl with respect to the base, a mixing and comminuting member within the bowl, and means responsive to associating the mixing bowl and base for connecting said mixing and comminuting member to a motor shaft journaled in said base, said last-mentioned means comprising a pair of spaced resilient members carried by a shaft journaled in said bowl, and a pin transversely extending through said motor shaft and engageable between said spaced resilient members.

2. In a food mixer, a base carrying a motor driven shaft, a bowl having a vertical impeller shaft journaled in the base thereof, to which shaft a comminuting propeller is secured within the bowl for comminuting vegetables and the like, and a clutch member secured to the shaft below the bowl comprising two vertically positioned resilient drive members spaced substantially equal distances from the axis of rotation, a cup-like, resilient, loose support for the bowl on the base wherein the bowl is adapted to set loosely enough to be permitted to adjust its position, means to prevent the bowl from turning relative to said cup-like resilient support, and a pin extending radially from the motor driven shaft adapted to engage sides of said resilient drive members, each said resilient drive member comprising a coil spring, the adjacent convolutions of which are substantially in contact, and means for supporting end convolutions of such spring, said pin engaging against intermediate convolutions.

3. In a food mixer, a base carrying a motor driven shaft, a bowl having a vertical impeller shaft journaled in the base thereof, to which shaft a comminuting propeller is secured within the bowl for comminuting vegetables and the like, and a clutch member secured to the shaft below the bowl comprising two vertically positioned resilient drive members spaced substantially equal distances from the axis of rotation, a cup-like, resilient, loose support for the bowl on the base wherein the bowl is adapted to set loosely enough to be permitted to adjust its position, means to prevent the bowl from turning relative to said cup-like resilient support, and a pin extending radially from the motor driven shaft adapted to engage sides of said resilient drive members, each said resilient drive member comprising a coil spring, the adjacent convolutions of which are substantially in contact, and means for supporting end convolutions of such spring, said pin engaging against intermediate convolutions, said means for supporting end convolutions of the spring comprising a pin having a base engaging one end convolution, and a nut engaging the other end convolution, said nut having an exposed surface rounded to prevent engagement against said pin when the bowl is placed in position in the cup-like support.

4. A drive connection adapted for connection of the drive shaft and driven shaft of a mixing device of the character described, said drive connection comprising a shaft, a disc axially secured to one end of said shaft, a pair of pins secured to said disc in parallel relation to said shaft and equally spaced from the axis of rotation thereof, springs surrounding said pins having convolutions substantially in mutual contact, said springs supported in spaced relation to said pins, a second shaft in alignment with the first shaft, and a pin extending radially through said second shaft and between said first-mentioned pins and adapted to engage said springs intermediate their ends.

5. A drive connection adapted for connection of the drive shaft and driven shaft of a mixing device of the character described, said drive connection comprising a shaft, a disc axially secured to one end of said shaft, a pair of pins secured to said disc in parallel relation to said shaft and equally spaced from the axis of rotation thereof, springs surrounding said pins having convolutions substantially in mutual contact, said springs supported in spaced relation to said pins, a second shaft in alignment with the first shaft, and a pin extending radially through said second shaft and between said first-mentioned pins and adapted to engage said springs intermediate their ends, said first-mentioned pins having a shoulder near their points of attachment to said disc, and having a nut threaded on the projecting end thereof, said nut having a recess forming an annular shoulder, each said spring having its end convolutions engaged around said shoulders, and the springs being clamped between the said disc and nuts, whereby to hold said springs in spaced relation to said pins in the manner and for the purpose described.

6. In a food mixer comprising a base carrying a motor and drive shaft, and a removable bowl carrying a mixing and comminuting propeller and shaft journalled through its bottom and adapted to be brought into driving engagement with said motor drive shaft, the combination of a cup-like resilient loose support for said bowl on said base, and a loose resilient connection between said motor drive shaft and said propeller shaft, said loose resilient connection comprising a transverse pin carried by one shaft, and a pair of spaced resilient members carried by the other shaft between which said pin is adapted to engage.

7. In a food mixer comprising a base carrying a motor and drive shaft, and a removable bowl carrying a mixing and comminuting propeller and shaft journalled through its bottom and adapted to be brought into driving engagement with said motor drive shaft, the combination of a cup-like resilient loose support for said bowl on said base, and a loose resilient connection between said motor drive shaft and said propeller shaft, said loose resilient connection comprising transverse pin carried by one shaft, and a pair of spaced resilient members carried by the other shaft between which said pin is adapted to engage, each said resilient member comprising a coil spring having its axis in alignment with but displaced from the axis of said shafts, and means for supporting end convolutions, the pin engaging the spring at a point intermediate said end convolutions.

MYRON J. LANDGRAF.